United States Patent
Lee (10) Patent No.: US 6,595,097 B2
(45) Date of Patent: Jul. 22, 2003

(54) BAND SAW SHIELDING DEVICE OF BAND SAWING MACHINE

(75) Inventor: Lien-Chu Lee, Taichung Hsien (TW)

(73) Assignee: Oav Equipment & Tools, Inc. (TW)

( * ) Notice: Subject to any disclaimer, the term of this patent is extended or adjusted under 35 U.S.C. 154(b) by 0 days.

(21) Appl. No.: 09/899,940

(22) Filed: Jul. 9, 2001

(65) Prior Publication Data

US 2003/0005806 A1 Jan. 9, 2003

(51) Int. Cl.⁷ .................................................. B26D 1/46
(52) U.S. Cl. ........................ 83/814; 83/100; 83/397
(58) Field of Search ........................... 83/100, 814, 397, 83/478, 860, 812, 810, 811

(56) References Cited

U.S. PATENT DOCUMENTS

| | | | | |
|---|---|---|---|---|
| 2,371,731 A | * | 3/1945 | Boice | |
| 3,848,502 A | * | 11/1974 | O'Neill | 83/360 |
| 3,888,148 A | * | 6/1975 | Weissman | 144/252.1 |
| 3,939,749 A | * | 2/1976 | Muller et al. | 83/397 |
| 3,974,724 A | * | 8/1976 | Shadle | 83/360 |
| 4,204,444 A | * | 5/1980 | Kohr | 83/544 |
| 4,882,962 A | * | 11/1989 | Terpstra et al. | 83/812 |

* cited by examiner

Primary Examiner—Paul T. Sewell
Assistant Examiner—Tom P Duong
(74) Attorney, Agent, or Firm—Browdy and Neimark, P.L.L.C.

(57) ABSTRACT

A band saw shielding device is linked with an elevation guiding set of a band sawing machine comprising a wheel on which the band saw runs, and a stop portion. The shielding device comprises a main housing fastened with the elevation guiding set and having a front plate with a hollowed portion, a position confining portion disposed longitudinally and a band replacing slot, a receiving space formed in the center thereof for receiving the band saw; a movable cover having a slide plate disposed slidably at the position confining portion of the main housing, a stop edge connected with the slide plate and stopped by the stop portion of the band sawing machine. The shielding device cooperates with the elevation guiding set to surround the band saw, so as to prevent the band saw from being a safety hazard. The wheel is still received in the hollowed portion without interference when the main housing is raised.

7 Claims, 8 Drawing Sheets

BAND SAW SHIELDING DEVICE OF BAND SAWING MACHINE

FIELD OF THE INVENTION

The present invention relates generally to a band sawing machine, and more particularly to a band saw shielding device of the band sawing machine.

BACKGROUND OF THE INVENTION

The conventional band sawing machine is generally operated in a constant space such that the band saw is exposed for a predetermined length to facilitate the controlling of elevation of the elevation guide set of the band saw, so as to cut materials various in thickness.

As the thicker material is cut, the exposed portion of the band saw is longer and is in the state of operation. As a result, a machine operator is vulnerable to injuries.

Certain conventional machines are provided with a protective device for shielding the band saw. In the process that the device is raised, one side of the top of the device comes in contact with the outer periphery of the wheel, thereby resulting in limitation of the elevation range of the device. As a result, the sawing height or thickness is substantially reduced to call for the elevation adjustment of the band saw. Such an elevation adjustment of the band saw is often a source of inconvenience to the machine operator.

SUMMARY OF THE INVENTION

It is the primary objective of the present invention to provide a band sawing machine with a band saw shielding device capable of protecting the machine operator against injuries caused by the band saw in operation.

It is another objective of the present invention to provide a band sawing machine with a band saw shielding device which is designed to cooperate with the machine platform elevation device, thereby simplifying the structure of the band saw shielding device and enabling the band saw shielding device to operate with precision.

The device of the present invention is mounted in conjunction with an elevation guiding set of a band sawing machine. The band sawing machine comprises a wheel with its outer periphery being used to run the band saw for actuating the wheel; a stop portion located on the band sawing machine such that the stop portion is corresponding to a predetermined position of the wheel. The shielding device of the present invention comprises a main housing of a hollow construction and having a front plate which is provided with a hollowed portion, a position confining portion disposed longitudinally thereon to form a band replacing slot for passing the band saw, a receiving space formed in the center thereof for receiving the band saw, and a fixation portion for fixing the elevation guiding set; a movable cover having a slide plate capable of controllably cooperating with the position confining portion of the main housing, a stop edge disposed on the top of the slide plate such that the stop edge is stopped by the stop portion of the band sawing machine.

The shielding device cooperates with the elevation guiding set to surround the band saw to prevent the machine operator from being wounded by the band saw. The movable cover is not elevated along with the elevated main housing. As a result, the wheel is disposed in the hollowed portion of the main housing without being interfered, thereby enabling the elevation guiding set to be elevated higher to facilitate the sawing of a thicker material.

The main housing is provided in two sides of the position confining portion thereof with a slide slot.

DETAILED DESCRIPTION OF THE INVENTION

As shown in FIGS. 1–4, a band saw shielding device 1 of the preferred embodiment of the present invention is mounted on an elevation guiding set 5 of a band sawing machine for fitting with a band saw 6 such that the band saw 6 is prevented from causing injuries to the machine operator.

The elevation guiding set 5 has a rack 51 which can be driven by gear to ascend and descend, a fixation portion 53 provided with two threaded hole (not shown in the drawing) and a guide member 57.

The band sawing machine further comprises a wheel 7 which is actuated by the band saw 6 running thereon; a stop portion 8 disposed at a predetermined position of the band sawing machine; and a platform 9 for placing a workpiece.

Figure 5:
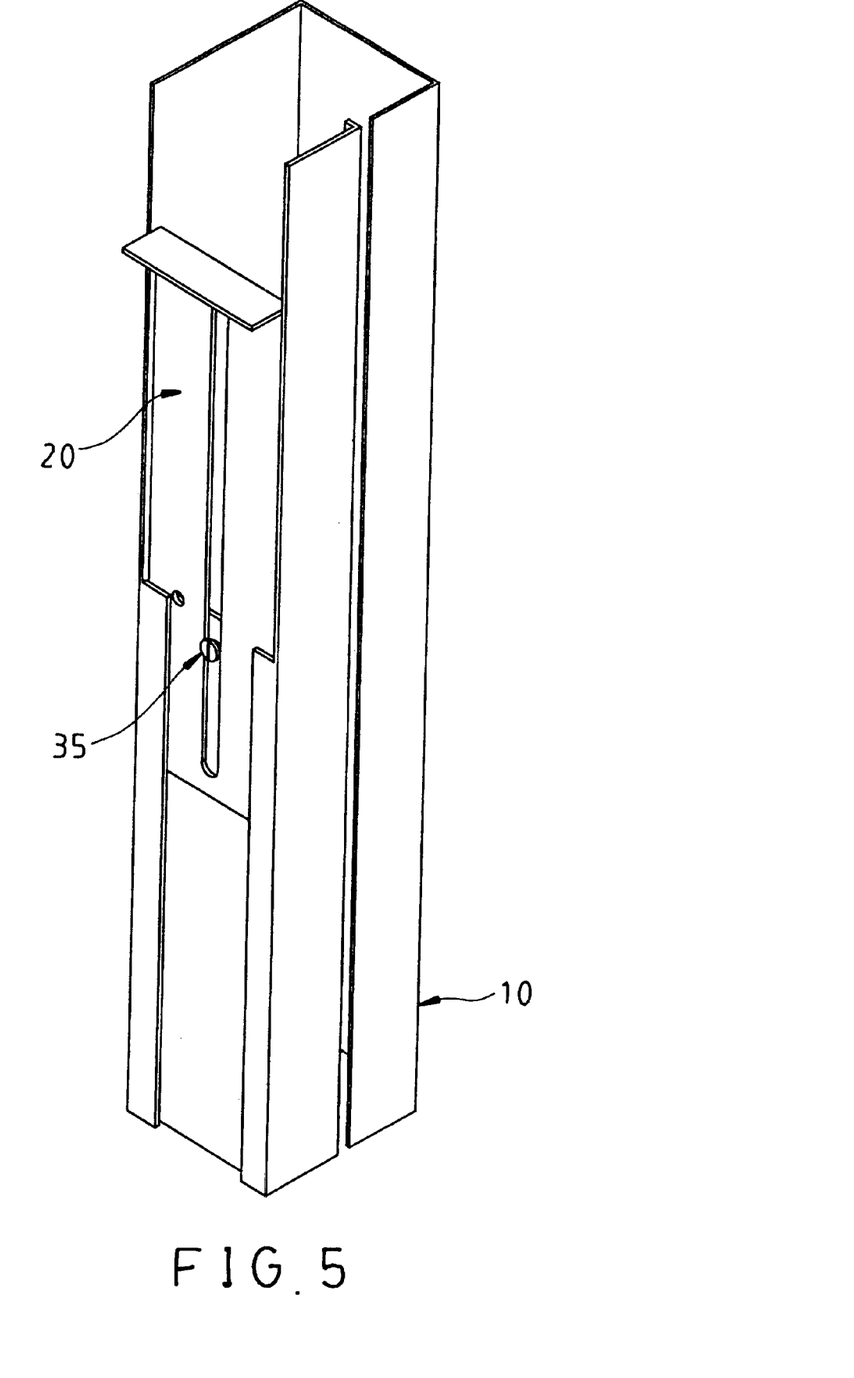
FIG. 5 shows a perspective view of the preferred embodiment of the present invention.
Figure 6:
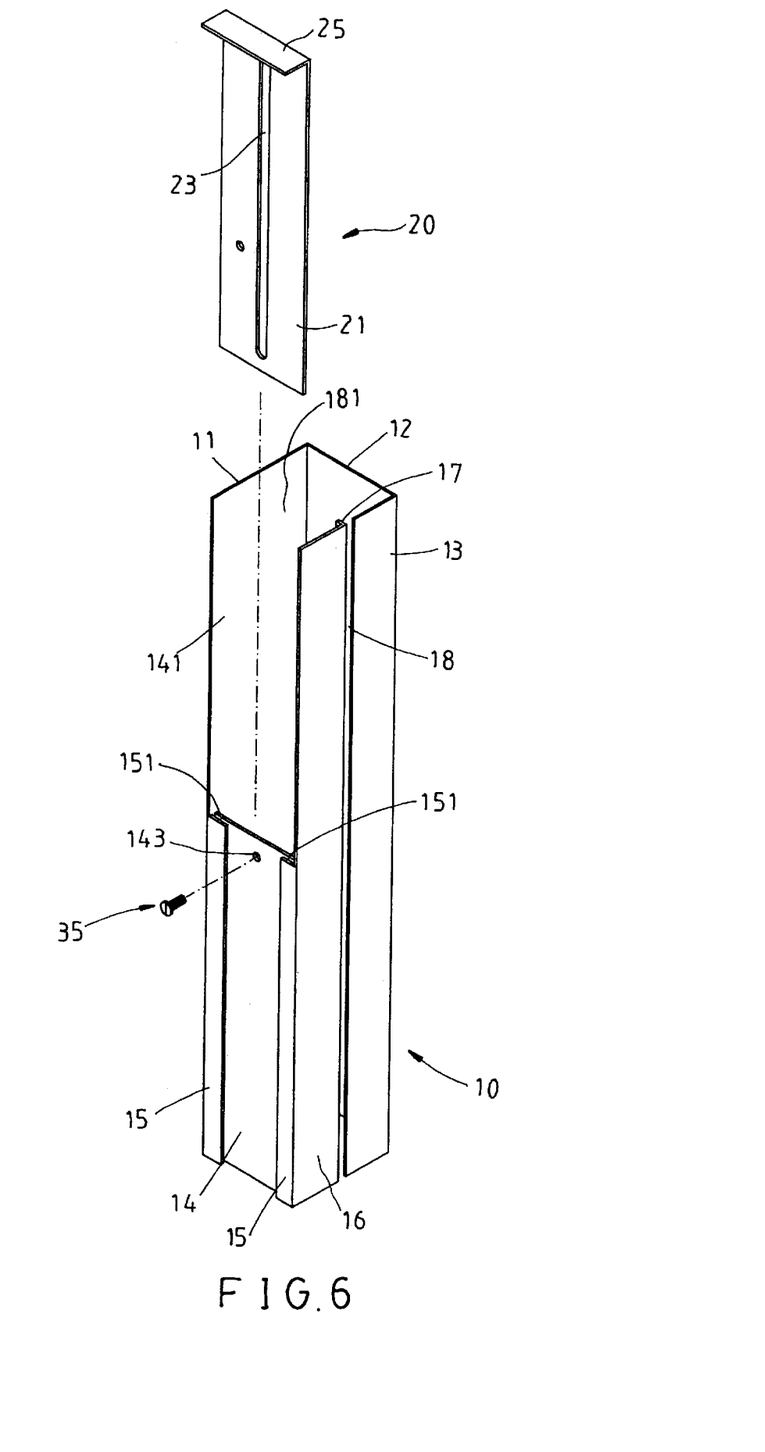
FIG. 6 shows an exploded view of the preferred embodiment of the present invention.
Figure 7:
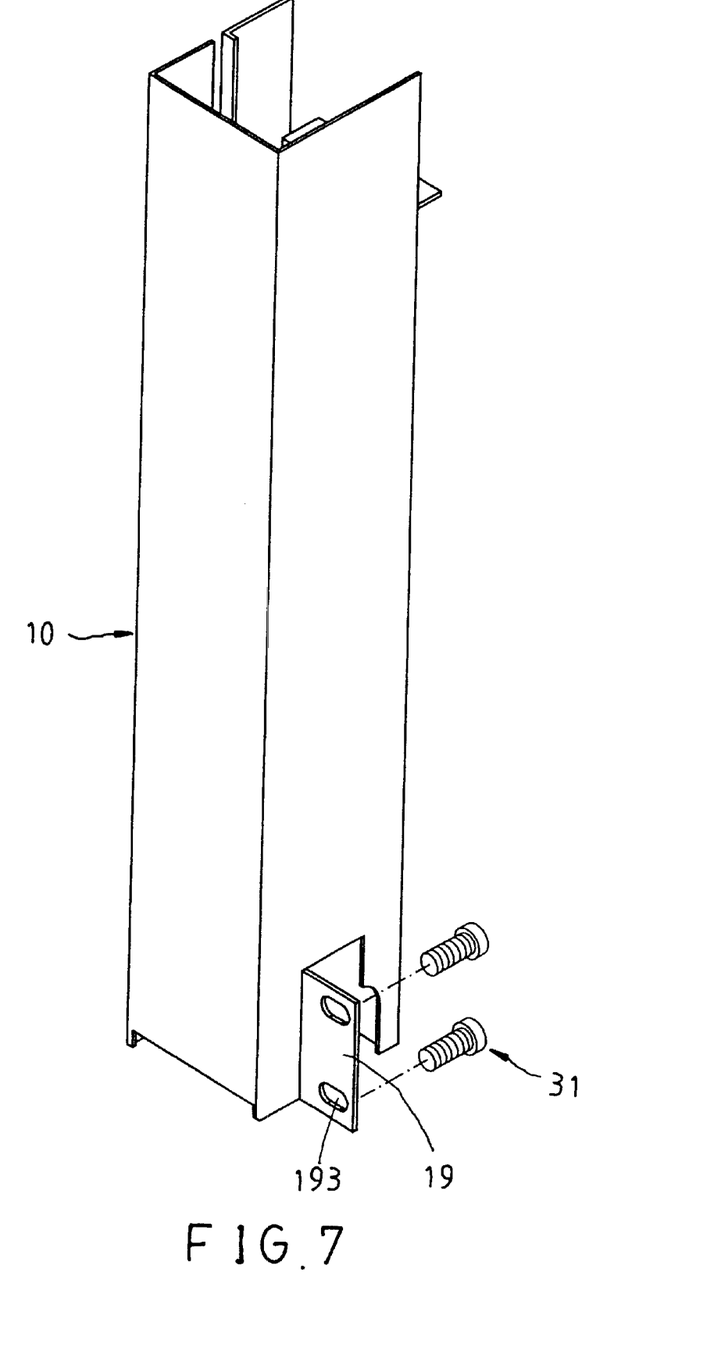
FIG. 7 shows another perspective view of the preferred embodiment of the present invention.

As shown in FIGS. 5–7, the band saw shielding device 1 comprises the following component parts.

A main housing 10 is of a hollow construction and has a side plate 11, a back plate 12 connected with one side of the side plate 11, a first piece 13 connected with the back plate 12, a front plate 14 connected with the lower half portion of the other side of the side plate 11 and provided with a hollowed portion 141, a threaded hole 143 disposed at the center of the top thereof, two slide edges 15 connected with two sides of the front plate 14 and provided with a slide slot 151, a second piece 16 connected with the front plate 14 and corresponding in length to the first piece 13, a folding edge 17 connected with the side of the second piece 16 and provided with a band replacing slot 18, a receiving space 181 formed at the center thereof, a fixation piece 19 connected with the bottom of the side plate 11 and provided with two fixation holes 193.

A movable cover 20 has a slide plate 21 slidably disposed in the two side edges 15 of the main housing 10, a position confining hole 23 disposed longitudinally in the center thereof such that the position confining hole 23 is corresponding in location to the threaded hole 143 of the main housing 10, and a stop edge 25 connected with the top edge of the slide plate 21 such that the stop edge 25 is curved outwards at an angle of 90 degrees. When the movable cover 20 is in action, the stop edge 25 is stopped by the stop portion 8 of the band sawing machine, so as to prevent it from descending further.

Two bolts 31 are put through the fixation holes 193 of the main housing 10 and are then engaged with the threaded holes of the elevation guiding set 5. The shielding device 1 is fastened with the elevation guiding set 5 along which the shielding device 1 ascends and descends.

A position confining bolt 35 is put through the position confining hole 23 to engage the threaded hole 143 of the main housing 10, thereby confining the left position and the right position of the movable cover 20 which is still capable of an up-and-down displacement.

Figure 1:
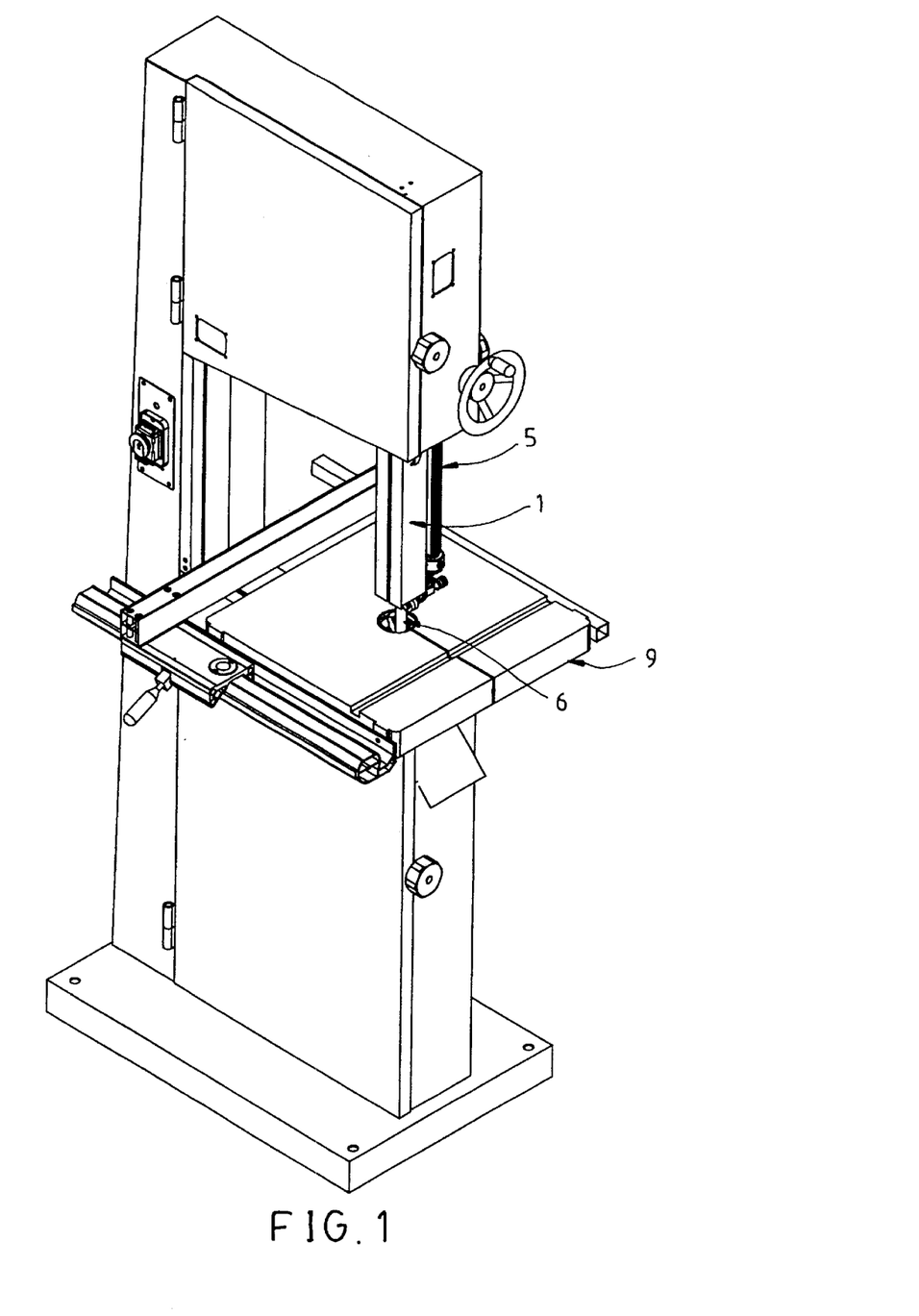
FIG. 1 shows a perspective view of the present invention along with a band sawing machine.
Figure 2:
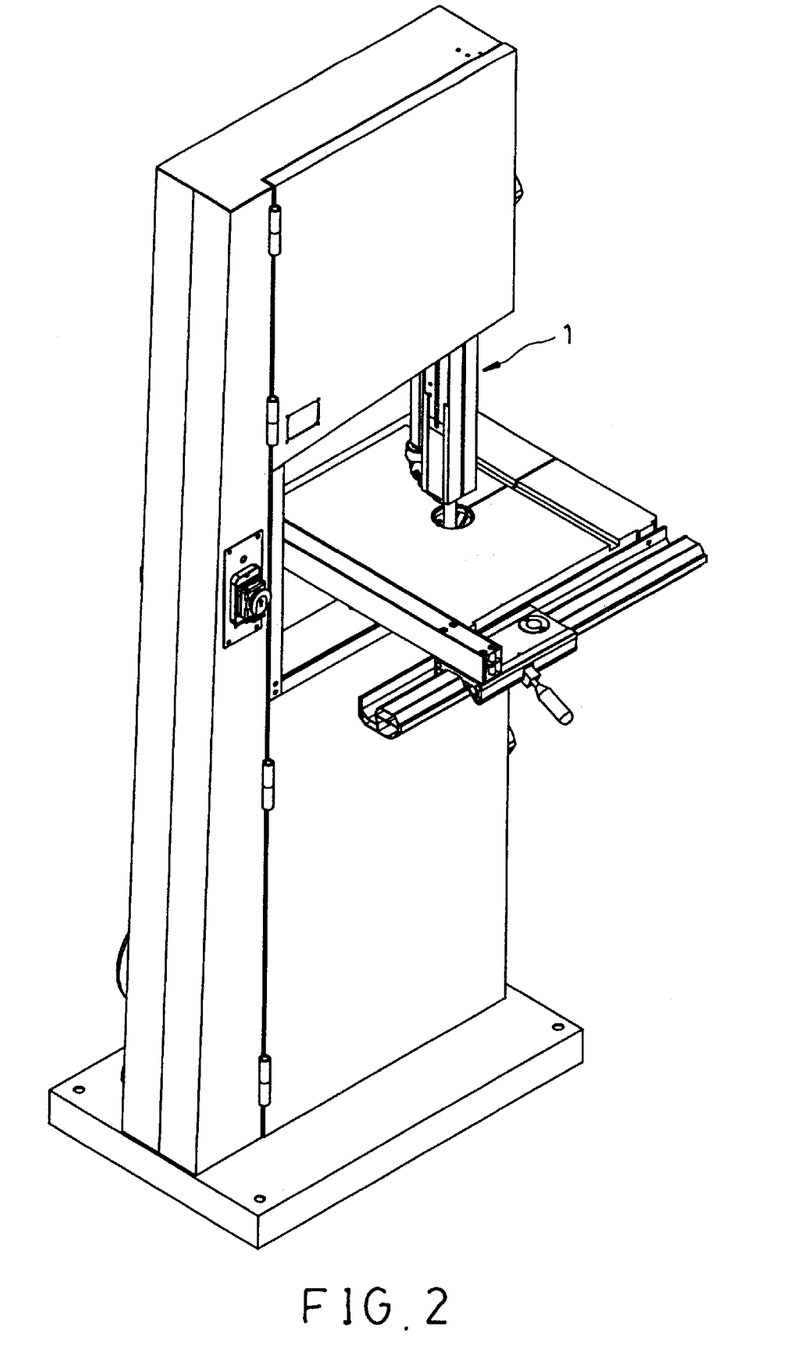
FIG. 2 shows another perspective view of the present invention along with the band sawing machine.
Figure 3:
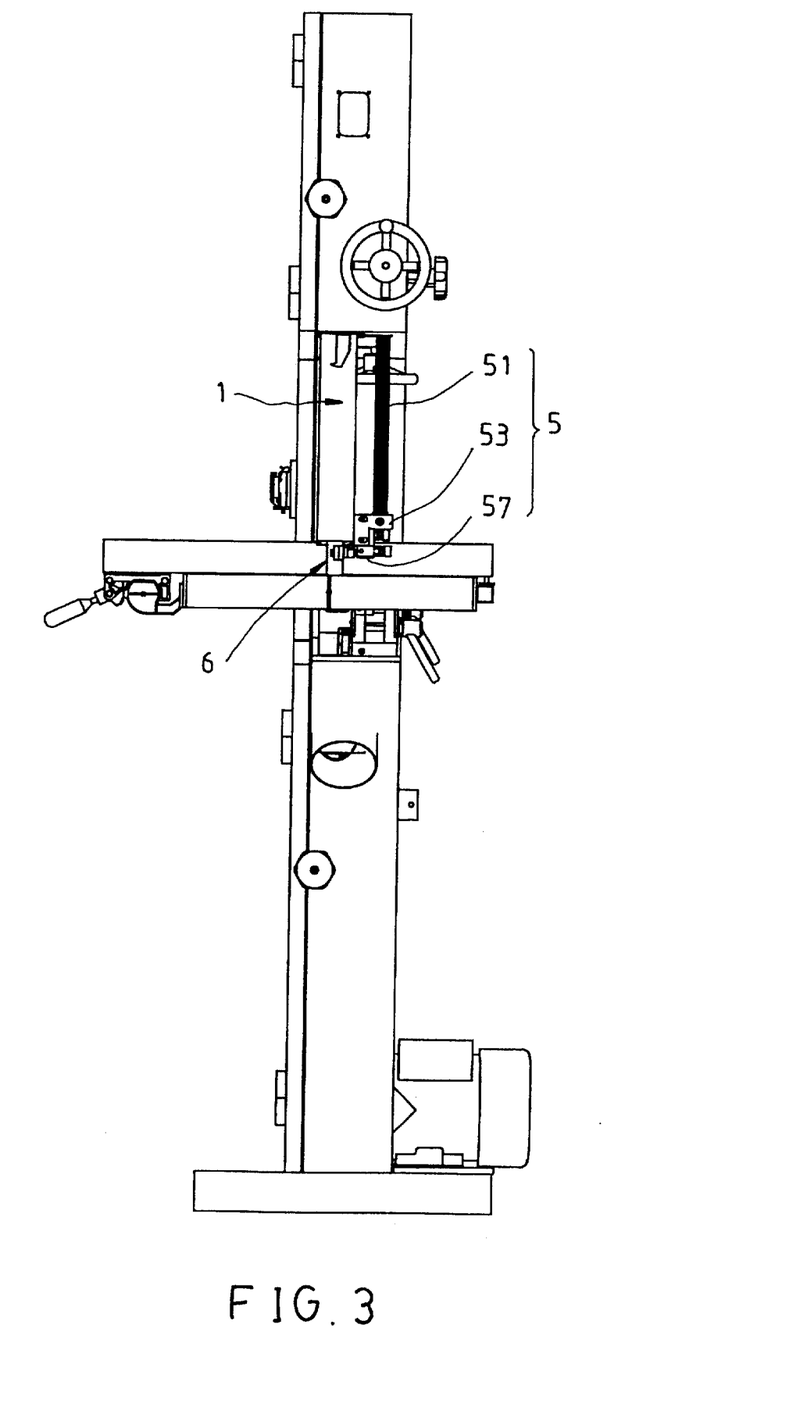
FIG. 3 shows a side view of the present invention mounted on the band sawing machine.

As shown in FIGS. 1–3, the main housing 10 is fastened with the elevation guiding set 5 by a plurality of bolts 31 which are engaged with the threaded holes (not shown in the drawings) of the elevation guiding set 5 via the fixation hole 193.

Figure 4:
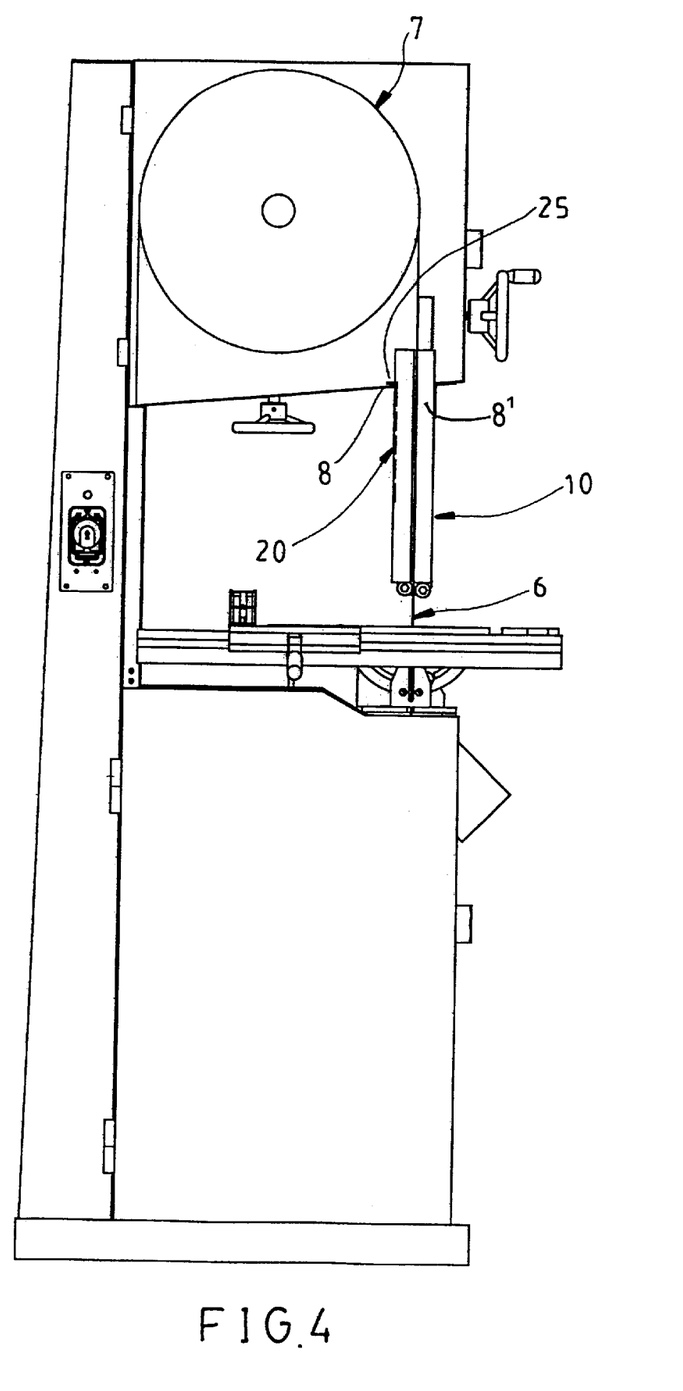
FIG. 4 is a front view of a preferred embodiment of the present invention mounted on a band sawing machine (without the cover thereof) to show the descending state of the elevation guiding set.

As shown in FIG. 4, the band saw 6 is disposed in the band replacing slot 18 of the main housing 10 such that the band saw 6 is located in the receiving space 181 of the main housing 10, and that the band saw 6 is shielded.

The main housing 10 descends along with the elevation guiding set 5. The stop edge 25 of the movable cover 20 is stopped by the stop portion 8 of the band sawing machine, thereby enabling the shielding device 1 to shield the band saw 6 located at the upper portion.

In the front half section of the ascending process, the main housing 10 and the elevation guiding set 5 ascend together. However, the movable cover 20 is still stopped at the stop portion 8. The slide plate 21 slides in the slide slot 151 of the two slide edges 15 of the main housing 10.

Figure 8:
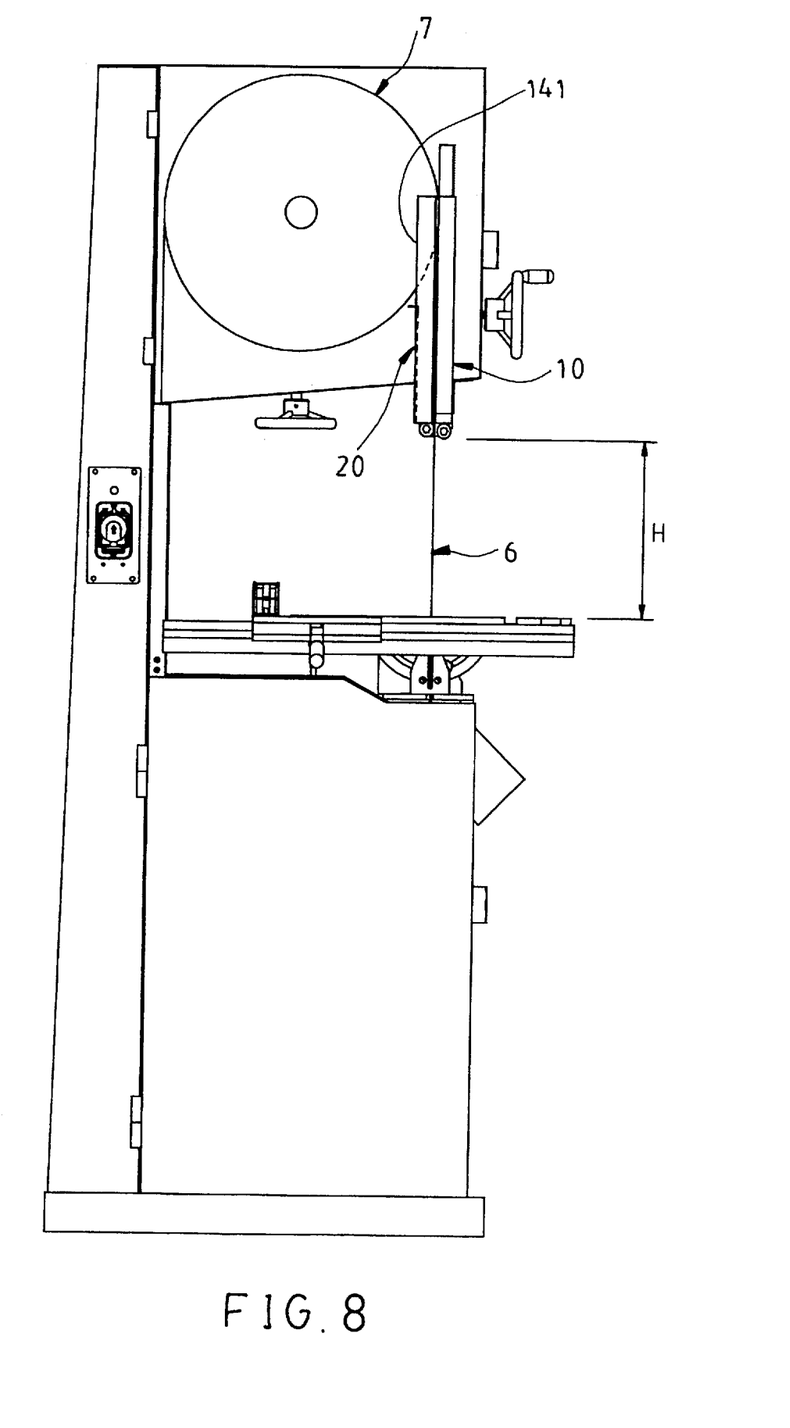
FIG. 8 is same as FIG. 4 for showing the ascending state of the elevation guiding set.

As shown in FIG. 8, in the wake of the ascending process, the main housing 10 ascends such that the top portions of the slide edges 15 come in contact with the underside of the stop edge 25 of the movable cover 20. As a result, the movable cover 20 is raised.

The hollowed portion 141 of the main housing 10 is fitted with the outer periphery of the side portion of the wheel 7, without the incident of interference. The shielding device 1 can be lifted to a higher position to form a greater sawing height H to facilitate the cutting of a thicker workpiece.

The present invention has the following advantages over the prior art.

The main housing and the movable cover of the present invention surround the band saw to prevent the band saw from inflicting a bodily injury on the machine operator. In addition, the band saw is prevented from being contacted by a foreign object.

The shielding device of the present invention is designed in such a manner that the shielding device cooperates with the elevation device of the machine platform, thereby enabling the band saw to move in a greater range to facilitate the sawing of a thicker workpiece with ease and precision.

What is claimed is:

1. A band saw shielding device adapted for to be mounted on an elevation guiding set of a band sawing machine, the band sawing machine having a wheel on which a band saw turns and a stop hole below the wheel through which the shielding device can be raised or lowered by the elevation guiding set, the shielding device comprising:

a main housing, adapted to substantially surround all sides of the band saw, having a front plate with a position confining portion thereon, a band replacing slot for receiving the band saw, a hollow space through which the band saw can move and a fixation portion for attachment to the elevation guiding set; and a slide plate engaged in the position confining portion of the main housing which is slidable relative to the main housing, the slide plate having a stop edge on a top end thereof;

wherein when the main housing is lowered through the stop hole the stop edge can engage an edge of the stop hole and initiate sliding of the slide plate in the position confining portion until an opening into the hollow space above the front plate is closed by the slide plate; and when the main housing is raised through the stop hole the front plate will engage the stop edge of the slide plate until the opening above the front plate is opened to permit the wheel to enter the hollow space.

2. The shielding device as defined in claim 1, wherein said position confining portion has two slide edges which are formed in two sides of said front plate and are each provided with a slide slot for said slide plate.

3. The shielding device as defined in claim 1, wherein said main housing a square cross section and has a side plate; a back plate connected with one side of said side plate, a first piece connected with said back plate, and a second piece connected with said front plate.

4. The shielding device as defined in claim 1, wherein said front plate has a threaded hole; said slide plate is provided with a position confining hole extending longitudinally and corresponding to said threaded hole a position confining bolt passing through the position confining hole to engage said threaded hole, thereby confining a left and a right displacement of said slide plate.

5. The shielding device as defined in claim 1, wherein said main housing the fixation portion is connected on a bottom thereof and is provided with two fixation holes for engaging a bolt.

6. The shielding device as defined in claim 1, wherein the main housing is tubular.

7. The shielding device as defined in claim 1, wherein said main housing is provided in one of the two side plates of the band replacing slot with a folding edge formed inwards.

\* \* \* \* \*